Patented Nov. 22, 1949

2,489,086

UNITED STATES PATENT OFFICE 2,489,086

STABILIZED TINCTURE OF DIGITALIS

Edgar A. Ferguson, Jr., Brooklyn, N. Y.

No Drawing. Application March 26, 1946,
Serial No. 657,333

9 Claims. (Cl. 167—65)

The present invention relates to a new and improved therapeutic agent, and is more particularly concerned with the production of a tincture of digitalis which is stabilized with respect to deterioration upon standing.

As is well known, present-day U. S. P. tincture of digitalis is subject to deterioration and this deterioration manifests itself in at least two known effects. The first effect is a reduction of the standardization to a strength below the labeled amount. The second effect is the formation, during deterioration, of products which may, and oftentimes do, result in toxic effects, especially in regard to gastro-intestinal upset. As a matter of fact, gastro-intestinal upset has always been a complication of digitalis medication.

It has now been found, in accordance with the present invention, that deterioration of U. S. P. tincture of digitalis is caused, for the most part, by adsorption of actinic rays by the green coloring matter in the standard tincture, and that if the material imparting this green color is removed from the tincture, the keeping qualities are markedly enhanced.

In removing the material imparting the green color, any decolorizing charcoal may be used. Animal charcoal is preferable, but various vegetable charcoals may likewise be used. Particularly good decolorizing may be obtained through the use of Darco decolorizing charcoal, a well known and highly effective animal charcoal.

The following specific example is given as exemplary of the procedural steps carried out in the practice of the invention.

One-quarter gm. of Darco decolorizing charcoal is mixed with 100 cc. of U. S. P. tincture of digitalis made according to directions contained in U. S. P. XII. The mixture is shaken thoroughly and then filtered. The filtrate is a clear brown liquid devoid of green coloring matter.

The amount of charcoal employed should be barely sufficient to eliminate the green color but not sufficient to lighten the brown color. No harmful effect would occur if the brown color were eliminated except that it would be uneconomical as some of the active digitalis principal is left behind on the filter.

As an alternative procedure, the U. S. P. tincture could be passed through a fixed column of decolorizing charcoal, but the foregoing so-called "contact" procedure is preferable.

While, as stated, the deterioration of U. S. P. tincture of digitalis is due, for the most part, to the action of actinic rays on the green coloring matter, there may be, and probably are, other colorless materials which likewise are selectively adsorbent with respect to actinic rays and their presence would likewise result in further deterioration.

It is therefore desirable to add to the tincture of digitalis, decolorized as outlined above, a small amount of an actinic ray desensitizer. For this purpose, any dye known to have desensitizing properties may be employed. For instance, as little as one gram of aniline red, of the kind used as a certified food dye, has been found to give good results. When the dye is added, actinic rays can no longer penetrate into the solution to cause deterioration therein. Obviously, dyes other than aniline red may be used provided they can sufficiently desensitize actinic rays. One of these, for instance, is phenyl-safranine. Tests of actinic desensitizing power are made by immersing panchromatic plates in a solution of the dye for a period of five minutes while developing. At the same time, exposure to the light of a 25-watt bulb at an 8-foot distance is made.

By virtue of the present invention, tincture of digitalis may be dispensed in clear glass bottles and kept at effective strength in a daylighted place for much longer periods of time than is the case with U. S. P. tincture.

It is understood, of course, that after decolorizing and treatment with dye, the product is restandardized to U. S. P. strength and adjusted for any deviation from that strength. It should be understood, furthermore, that the new tincture has precisely the same therapeutic uses as the present U. S. P. tincture.

What is claimed is:

1. As a new therapeutic agent, U. S. P. tincture of digitalis decolorized with respect to green coloring matter and having enhanced keeping qualities, said coloring matter having been removed by adsorbent charcoal treatment after the tincture is formed.

2. As a new therapeutic agent, U. S. P. tincture of digitalis decolorized with respect to green coloring matter and containing an actinic ray desensitizer, said coloring matter having been removed by adsorbent charcoal treatment after the tincture is formed.

3. As a new therapeutic agent, U. S. P. tincture of digitalis decolorized with respect to green coloring matter and containing aniline red, said coloring matter having been removed by adsorbent charcoal treatment after the tincture is formed.

4. As a new therapeutic agent, U. S. P. tincture of digitalis decolorized with respect to green coloring matter and containing phenyl-safranine, said coloring matter having been removed by adsorbent charcoal treatment after the tincture is formed.

5. A method for improving the keeping qualities of U. S. P. tincture of digitalis which comprises contacting the tincture with adsorbent charcoal to remove green coloring matter, and then re-standardizing the tincture to U. S. P. standards.

6. A method for improving the keeping qualities of U. S. P. tincture of digitalis which comprises contacting the tincture with adsorbent charcoal to remove green coloring matter, and adding an actinic ray desensitizer to the resulting brown solution.

7. A method for improving the keeping qualities of U. S. P. tincture of digitalis which comprises contacting the tincture with adsorbent charcoal to remove green coloring matter, adding an actinic ray desensitizer to the resulting brown solution, and re-standardizing to U. S. P. standards.

8. A method for improving the keeping qualities of U. S. P. tincture of digitalis which comprises contacting the tincture with adsorbent charcoal to remove green coloring matter, and adding aniline red to the resulting brown solution.

9. A method for improving the keeping qualities of U. S. P. tincture of digitalis which comprises contacting the tincture with adsorbent charcoal to remove green coloring matter, and adding phenyl-safranine to the resulting brown solution.

EDGAR A. FERGUSON, JR.

REFERENCES CITED

The following references are of record in the file of this patent:

UNITED STATES PATENTS

| Number | Name | Date |
|---|---|---|
| 1,703,377 | Anderson | Feb. 26, 1929 |
| 1,864,185 | Christmann | July 21, 1932 |

FOREIGN PATENTS

| Number | Country | Date |
|---|---|---|
| 105,482 | Austria | Feb. 10, 1927 |

OTHER REFERENCES

Remington et al.: "The Practice of Pharmacy," J. P. Lippincott (1907) pages 221, 222, 351.

Wood-Lawall: Dispensatory of U. S., 21st ed., 1926, J. P. Lippincott Co., Phila., pages 1102-1103.